(12) United States Patent
Sakurai et al.

(10) Patent No.: US 10,469,162 B2
(45) Date of Patent: Nov. 5, 2019

(54) DETECTION DEVICE

(71) Applicant: Santec Corporation, Aichi (JP)

(72) Inventors: Yasuki Sakurai, Aichi (JP); Naoyuki Mekada, Aichi (JP)

(73) Assignee: Santec Corporation, Aichi (JP)

( * ) Notice: Subject to any disclaimer, the term of this patent is extended or adjusted under 35 U.S.C. 154(b) by 0 days.

(21) Appl. No.: 15/669,439

(22) Filed: Aug. 4, 2017

(65) Prior Publication Data

US 2018/0041271 A1 Feb. 8, 2018

(30) Foreign Application Priority Data

Aug. 5, 2016 (JP) ................................. 2016-154776

(51) Int. Cl.
*H04B 10/077* (2013.01)
*G02B 6/42* (2006.01)
*G02B 6/32* (2006.01)
*G02B 6/38* (2006.01)

(52) U.S. Cl.
CPC ............. *H04B 10/077* (2013.01); *G02B 6/32* (2013.01); *G02B 6/3845* (2013.01); *G02B 6/4204* (2013.01); *G02B 6/4206* (2013.01); *G02B 6/4246* (2013.01)

(58) Field of Classification Search
CPC ...... G02B 6/4204; G02B 6/3845; G02B 6/32; G02B 6/42; G02B 6/262; G02B 6/4201; G02B 6/4286; G02B 6/2817; G02B 6/327; G02B 6/4206; H04B 10/077; H04B 10/08; G02F 1/01; G02F 1/0147; H04J 14/02; H04J 14/0221

USPC ........................................ 398/25; 385/33, 88
See application file for complete search history.

(56) References Cited

U.S. PATENT DOCUMENTS

| | | | | |
|---|---|---|---|---|
| 5,175,783 A | * | 12/1992 | Tatoh | G02B 6/4202 250/227.11 |
| 5,296,724 A | * | 3/1994 | Ogata | G02B 6/4204 257/680 |
| 6,346,701 B1 | * | 2/2002 | Maruyanna | G01J 1/04 250/216 |
| 6,454,465 B1 | * | 9/2002 | Uschitsky | G02B 6/29364 385/34 |
| 6,603,906 B2 | * | 8/2003 | Qin | G02B 6/4204 385/48 |
| 6,922,281 B2 | * | 7/2005 | Pan | G02B 6/4201 359/341.1 |
| 7,044,660 B2 | * | 5/2006 | Pan | G02B 6/4201 359/341.3 |
| 7,130,121 B2 | * | 10/2006 | Pan | G02B 6/4201 359/484.04 |
| 7,333,693 B2 | * | 2/2008 | Nagata | G02B 6/2937 385/33 |

(Continued)

*Primary Examiner* — Abbas H Alagheband
(74) *Attorney, Agent, or Firm* — Osha Liang LLP

(57) ABSTRACT

A detection device is provided with a light-receiving module configured to output an electrical signal according to a power of an input light received at a light-receiving surface, an optical lens configured to collimate and guide to the light-receiving surface the input light from the outside, and at least one condensing unit that is provided in a path of the input light between the optical lens and the light-receiving surface and configured to decrease a beam diameter of the input light at the light-receiving surface.

8 Claims, 6 Drawing Sheets

(56) References Cited

U.S. PATENT DOCUMENTS

| | | | | |
|---|---|---|---|---|
| 7,346,237 B2* | 3/2008 | Matsumura | G02B 6/32 | 385/34 |
| 7,421,161 B2* | 9/2008 | Furuichi | G02B 6/327 | 385/33 |
| 8,194,182 B2* | 6/2012 | Kinoshita | G03B 17/00 | 250/208.1 |
| 8,987,655 B2* | 3/2015 | Sasada | G02B 6/4206 | 250/214.1 |
| 9,083,137 B2* | 7/2015 | Hayashi | H01S 5/02248 | |
| 2002/0094590 A1* | 7/2002 | Irie | H01S 5/02284 | 438/14 |
| 2003/0021537 A1* | 1/2003 | Qin | G02B 6/4204 | 385/48 |
| 2003/0206335 A1* | 11/2003 | Pan | G02B 6/4201 | 359/341.33 |
| 2004/0033033 A1* | 2/2004 | Hoshino | G02B 6/4204 | 385/93 |
| 2005/0280888 A1* | 12/2005 | Pan | G02B 6/4201 | 359/337 |
| 2006/0158718 A1* | 7/2006 | Pan | G02B 6/4201 | 359/341.1 |
| 2007/0183716 A1* | 8/2007 | Suzuki | G02B 6/262 | 385/33 |
| 2008/0044135 A1* | 2/2008 | Furuichi | G02B 6/327 | 385/34 |
| 2008/0080060 A1* | 4/2008 | Messerschmidt | G02B 21/0028 | 359/654 |
| 2009/0103867 A1* | 4/2009 | Huang | G02B 6/26 | 385/48 |
| 2010/0053394 A1* | 3/2010 | Kinoshita | G03B 17/00 | 348/294 |
| 2010/0074580 A1* | 3/2010 | Aizawa | G02B 6/425 | 385/33 |
| 2010/0321703 A1* | 12/2010 | Harpin | G01K 11/3206 | 356/477 |
| 2013/0161497 A1* | 6/2013 | Sasada | G02B 6/4206 | 250/227.23 |
| 2014/0224301 A1* | 8/2014 | Niwa | G02B 3/005 | 136/246 |
| 2017/0063485 A1* | 3/2017 | Lee | G02B 6/00 | |
| 2017/0309658 A1* | 10/2017 | Hamada | G02B 6/32 | |
| 2018/0026426 A1* | 1/2018 | Kawakita | H01S 5/142 | |

* cited by examiner

DETECTION DEVICE

FIELD

The present disclosure relates to a device for detecting a power of a light.

BACKGROUND

To monitor an optical communication operation in an optical communication network, the optical communication network is provided with an optical power monitor (for example, see patent literature 1). The optical power monitor is, for example, built into an optical communication device, detects a power of an optical communication signal, and provides information on the detected power to a controller in the optical communication device.

Included as one example of the optical communication network is a WDM (wavelength-division multiplexing) network. At a branching point of the WDM network, for example, as the optical communication device, a ROADM device is disposed. The ROADM device is provided with an optical switch for switching the optical communication signal to any path and/or branching/inserting the optical communication signal. The optical power monitor is, for example, mounted to this ROADM device and is used to control an optical amplifier in the ROADM device and transmit the optical communication signal at an optimal power. Additionally, the optical power monitor is also used in an optical communication device such as an optical transceiver or an optical transponder that sends/receives an optical communication signal to control and/or monitor the power of the optical communication signal.

CITATION LIST

Patent Literature

[Patent Literature 1] US2003/0021537 A1

With a detection device, the optical power monitor above being one example thereof, a need for size reduction is high. Therefore, to meet such a need, it is conceivable to adopt a small light-receiving element for the detection device. Adopting a small light-receiving element with a small light-receiving area contributes to decreasing a dark current and improving a detection precision of a power. However, when the small light-receiving element is used, due to the light-receiving area of the light-receiving element being small relative to a beam diameter of an input light, a received light quantity of the input light by the light-receiving element can become small. This decrease in the received light quantity has a possibility of adversely affecting the detection precision.

SUMMARY

One or more embodiments of the present invention provide a device that can suppress a decrease in a received light quantity that accompanies size reduction and detect a power of a light with high precision.

A detection device according to one aspect of the present disclosure is a detection device for detecting a power of an input light and is provided with a light-receiving module, an optical lens, and at least one condensing unit. The light-receiving module is configured to have a light-receiving surface and output an electrical signal according to a power of the input light received at the light-receiving surface. The optical lens is configured to collimate and guide to the light-receiving surface the input light from the outside. Moreover, the at least one condensing unit is provided in a path of the input light between the optical lens and the light-receiving surface and configured to decrease a beam diameter of the input light at the light-receiving surface.

According to this detection device, because the condensing unit decreases the beam diameter of the input light at the light-receiving surface, even in a situation where the light-receiving module has a comparatively small light-receiving area, a received light quantity of the input light decreasing in the light-receiving module can be suppressed and a decrease in a detection precision of the power that accompanies the decrease in the received light amount can be suppressed. Therefore, according to one aspect of the present disclosure, it is possible to provide a detection device that can suppress a decrease in a received light quantity that accompanies size reduction and detect a power of a light with high precision.

According to one aspect of the present disclosure, the at least one condensing unit above can include a condensing unit formed on a surface opposing the light-receiving surface of the optical lens. This condensing unit can be, for example, a condensing lens made of a resin coated on the surface opposing the light-receiving surface of the optical lens. According to one aspect of the present disclosure, the optical lens can be configured to collimate the input light from the outside and separate this input light into a transmitted light and a reflected light by a branching membrane provided on the surface opposing the light-receiving surface of the optical lens, guiding the transmitted light to the light-receiving surface. In this situation, the at least one condensing unit above can include a condensing unit formed adjacent to the branching membrane.

According to one aspect of the present disclosure, the at least one condensing unit above may include a condensing lens provided independently from the optical lens and the light-receiving module in the path of the input light between the optical lens and the light-receiving surface.

According to one aspect of the present disclosure, the light-receiving module can have a transparent covering body that covers the light-receiving surface. In this situation, the at least one condensing unit above can include a condensing unit formed on a surface of the covering body. This condensing unit can be, for example, a condensing lens made of a resin coated on the surface of the covering body. This condensing unit may be, for example, a condensing unit configured by a potting material identical to that of the covering body.

The configuration of the detection device described above can be applied to a detection device having a light-receiving surface of any size but is particularly meaningful when applied to a detection device where a diameter of a light-receiving surface is no more than 100 µm.

Furthermore, a need for size reduction is particularly high in a detection device that detects a power of an optical communication signal. Therefore, the configuration of the detection device described above may also be applied to a detection device that detects a power of an optical communication signal. In this situation, the detection device can be made to be of a configuration provided with an optical fiber pigtail including two optical fibers connected to an optical transmission line through which the optical communication signal is transmitted. The optical lens can be configured to collimate the input light from one end of an input fiber, which is one of the two optical fibers, and separate this input light into a transmitted light and a reflected light, guiding the transmitted light to the light-receiving surface and guiding the reflected light to an output fiber, which is the other of the two optical fibers. The light-receiving module can be configured to output the electrical signal according to the power of the input light that is the input light from the optical transmission line via the input fiber and received at the light-receiving surface.

DESCRIPTION OF EMBODIMENTS

Illustrative embodiments of the present invention are described below with reference to the drawings.

First Embodiment

Figure 1:
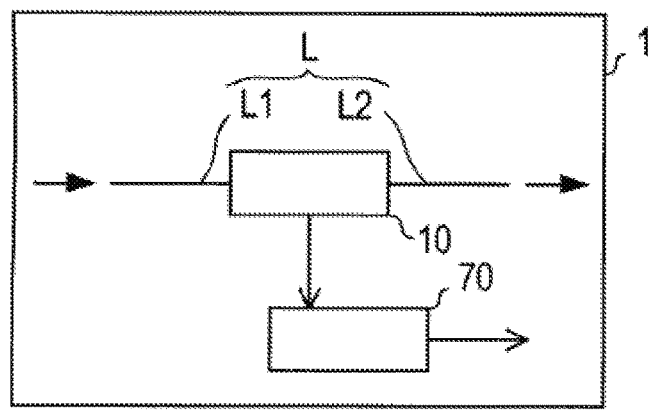
FIG. 1 A block diagram representing a schematic configuration of an optical communication device including a photodetector.

An optical communication device 1 of the present embodiment illustrated in FIG. 1 is provided with a tapped photodetector 10 connected to an optical transmission line L. In FIG. 1, an optical communication device 1 provided with a single photodetector 10 is illustrated. However, the optical communication device 1 may be a multiport communication device and may be made to be of a configuration where a photodetector 10 is provided to each transmission line at the ports. The optical communication device 1 can be any device from among, for example, a sending device, a receiving device, and a relay device in an optical communication network. The optical communication device 1 may be a management/monitoring device connected to the optical communication network for management and/or monitoring purposes.

The photodetector 10 detects a power of an input light from the optical transmission line L and inputs to a controller 70 in the optical communication device 1 an electrical signal according to this power as a detection signal. The input light can be any signal from among an optical communication signal received by the optical communication device 1 from an external device, an optical communication signal sent by the optical communication device 1 to an external device, and a transfer signal in a situation where the optical communication device 1 is a repeater such as a ROADM device.

Figure 2:
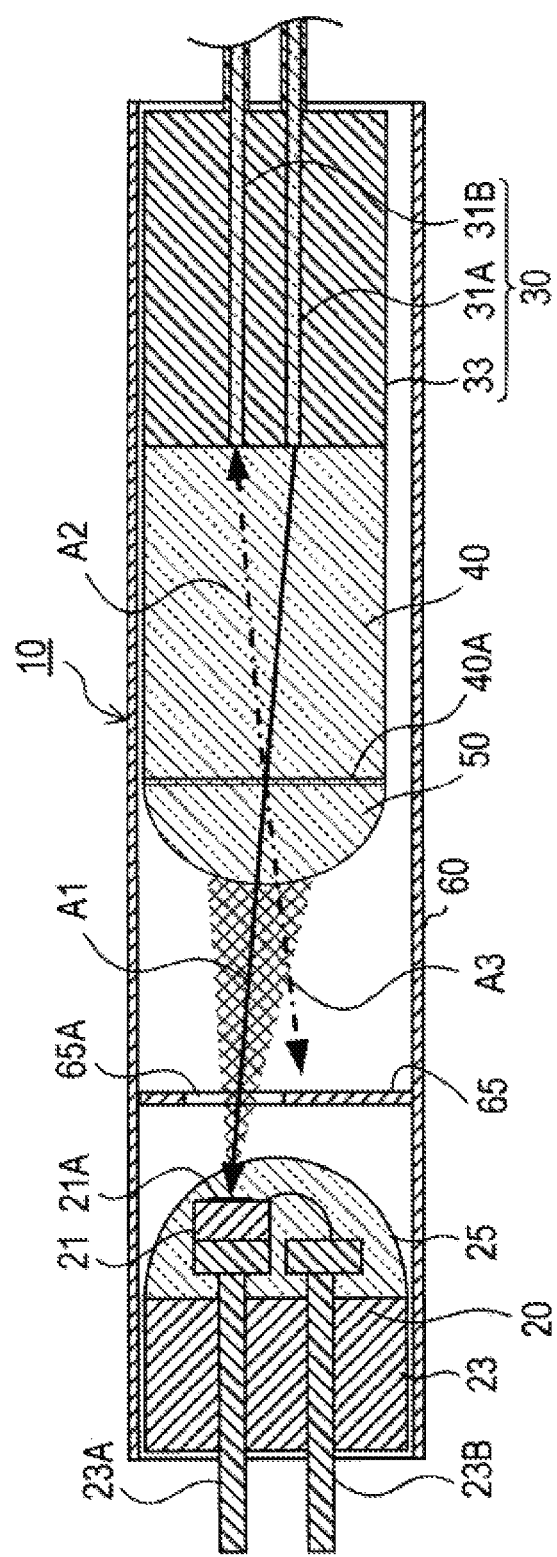
FIG. 2 A diagram schematically representing a cross-sectional structure at a centerline of a photodetector of a first embodiment.

The photodetector 10 is configured, for example, as illustrated in FIG. 2. The photodetector 10 illustrated in FIG. 2 is principally provided with a PD module 20, an optical fiber pigtail 30, a GRIN lens 40, a condensing lens 50, and a tubular case 60 that holds these. In this photodetector 10, the PD module 20, the optical fiber pigtail 30, and the GRIN lens 40 are arranged along a centerline of the tubular case 60.

As illustrated in FIG. 2, the PD module 20 is provided with a photodiode (PD) chip 21 as a light-receiving element, a cylindrical stem 23 that supports the PD chip 21, and a transparent resin layer 25 that covers and protects the PD chip 21. The stem 23 is provided with a pair of conductive electrode pins 23A, 23B penetrating the stem 23 from a front surface thereof to a rear surface thereof.

A top portion of the electrode pin 23A has the PD chip 21 mounted thereon, and a top portion of the electrode pin 23B is wire-bonded to the PD chip 21. Specifically, the electrode pin 23A is electrically connected to a cathode electrode formed on a rear surface of the PD chip 21, and the electrode pin 23B is electrically connected to an anode electrode formed on a front surface of the PD chip 21. That is, the electrode pins 23A, 23B function as lead lines from the PD chip 21 and function as a feeder to the PD chip 21 and a signal line from the PD chip 21.

These electrode pins 23A, 23B are connected to the controller 70. The controller 70 executes predetermined processing based on the detection signal of the power input from the PD chip 21 via these electrode pins 23A, 23B. Included as examples of the processing are processing that adjusts a gain of an optical amplifier and processing that displays a detection value of the power.

The PD chip 21 is provided with a light-receiving surface 21A in a front-surface central portion facing a GRIN-lens 40 side, provided with an anode electrode that is not illustrated in a front-surface corner portion thereof, and provided with a cathode electrode that is not illustrated on a rear surface thereof. This PD chip 21 inputs to the controller 70 the electrical signal according to a received light quantity (received optical power) at the light-receiving surface 21A as the detection signal via the electrode pins 23A, 23B of the stem 23.

Furthermore, the transparent resin layer 25 is formed by potting. That is, the transparent resin layer 25 is formed by a potting material being coated and cured on the stem 23 and the PD chip 21 in a state where the PD chip 21 is mounted on the electrode pin 23A in the stem 23.

Additionally, the optical fiber pigtail 30 is provided with two optical fibers 31A, 31B connected to the optical transmission line L and a two-core capillary 33 wherein the optical fibers 31A, 31B are inserted. In the capillary 33, the optical fibers 31A, 31B are disposed in parallel along an axis of the capillary 33. Specifically, the optical fibers 31A, 31B are disposed in parallel slightly away from each other in opposing directions from a center of the capillary 33. The two-core capillary 33 supports one end of the optical fibers 31A, 31B disposed in this manner.

The optical fiber 31A, which is one of these two optical fibers 31A, 31B, is used as an input fiber 31A for inputting the optical communication signal whose power is to be detected by the photodetector 10. The other optical fiber 31B is used as an output fiber 31B for returning the optical communication signal to the optical transmission line L.

An end portion on an opposite side of the end portion supported by the capillary 33 of the optical fibers 31A, 31B is connected to the optical transmission line L via a connector that is not illustrated. Specifically, the input fiber 31A is connected, within the optical transmission line L, to an optical transmission line L1 positioned upstream, in a transmission direction, of the photodetector 10 and the output fiber 31B is connected, within the optical transmission line L, to an optical transmission line L2 positioned downstream, in the transmission direction, of the photodetector 10.

The GRIN lens 40 is disposed adjacent to the capillary 33. The light from the input optical fiber 31A supported by the capillary 33 is input to the GRIN lens 40 disposed in this manner. The GRIN lens 40 is configured to collimate the input light and guide this collimated light to a PD-module 20 side.

The GRIN lens 40 has a branching membrane 40A on an end surface facing a light-receiving-surface 21A side of the PD module 20. The branching membrane 40A separates the light from the input fiber 31A arriving via a main body of the GRIN lens 40 into a transmitted light and a reflected light. As the branching membrane 40A, a branching membrane is selected where a light-quantity ratio between transmitted light and reflected light becomes a predetermined ratio. A ratio of the transmitted light is, for example, no more than 1% of the input light.

By being provided with this branching membrane 40A, the GRIN lens 40 guides a portion of the input light from the input fiber 31A (transmitted light) to the light-receiving surface 21A of the PD module 20. Moreover, the GRIN lens 40 guides a reflected-light component of the input light separated by the branching membrane 40A to the output fiber 31B. The reflected-light component is condensed in a path in the GRIN lens 40 leading to the output fiber 31B and is input to the output fiber 31B.

Arrow A1 illustrated by a solid line in FIG. 2 schematically illustrates a path of the transmitted light, propagated to the light-receiving surface 21A, among the input light from the input fiber 31A. The crosshatched region illustrated in FIG. 2 schematically represents a beam diameter of the transmitted light propagated to the light-receiving surface 21A. Arrow A2 illustrated by a dot-dash line in FIG. 2 schematically illustrates a path of the reflected light from the branching membrane 40A. Arrow A3 illustrated by a dot-dash line in FIG. 2 illustrates a returning light of the reflected light. A portion of the reflected light is not propagated downstream on the optical transmission line L via the output fiber 31B but is propagated, as the returning light, from the GRIN lens 40 to airspace on a PD-module 20 side.

With the photodetector 10, to suppress this returning light from reaching the light-receiving surface 21A, the PD module 20 is disposed at a certain interval from the GRIN lens 40. By the PD module 20 and the GRIN lens 40 being separated, on the PD-module 20 side, a certain distance is provided between the proper transmitted light and the returning light. Because of this, the PD module 20 can selectively receive the proper transmitted light at the light-receiving surface 21A. The proper transmitted light referred to here refers to the transmitted light from the branching membrane 40A of the input light intentionally guided to the light-receiving surface 21A that is not the returning light or other stray light.

Furthermore, to suppress the returning light and the other stray light from being received at the light-receiving surface 21A, an aperture wall 65 having an opening portion 65A is provided optionally between the GRIN lens 40 and the PD module 20. This opening portion 65A of the aperture wall 65 is provided in a position corresponding to a normal optical path of the transmitted light and suppresses light not arriving from the normal optical path of the transmitted light from being received at the light-receiving surface 21A.

The condensing lens 50 is disposed adjacent to a surface of the branching membrane 40A of the GRIN lens 40 and is configured to condense and guide to the light-receiving surface 21A of the PD module 20 the transmitted light (collimated light) output from the GRIN lens 40. The transmitted light propagated through the condensing lens 50 is condensed so the beam diameter at the light-receiving surface 21A is shrunk and is made incident to the light-receiving surface 21A.

The tubular case 60 is configured to house and hold therein the PD module 20, the optical fiber pigtail 30, the GRIN lens 40, and the condensing lens 50 described above. The tubular case 60 can be configured by combining several components. For example, the tubular case 60 may be configured by linking tubular components of the same diameter in an axial direction. The aperture wall 65 can be configured as a portion of the tubular case 60.

Next, the function of the condensing lens 50 is described. In a situation of configuring the photodetector 10 using a PD chip 21 of a small light-receiving area for size reduction and dark-current reduction of the photodetector 10, the received light quantity at the light-receiving surface 21A tends to become small. With a PD chip 21 where the light-receiving surface 21A is relatively small compared to the beam diameter, a light-receiving ratio, which is a ratio of the transmitted light output from the GRIN lens 40 received at the light-receiving surface 21A, becomes considerably small (see FIG. 6).

Figure 3:
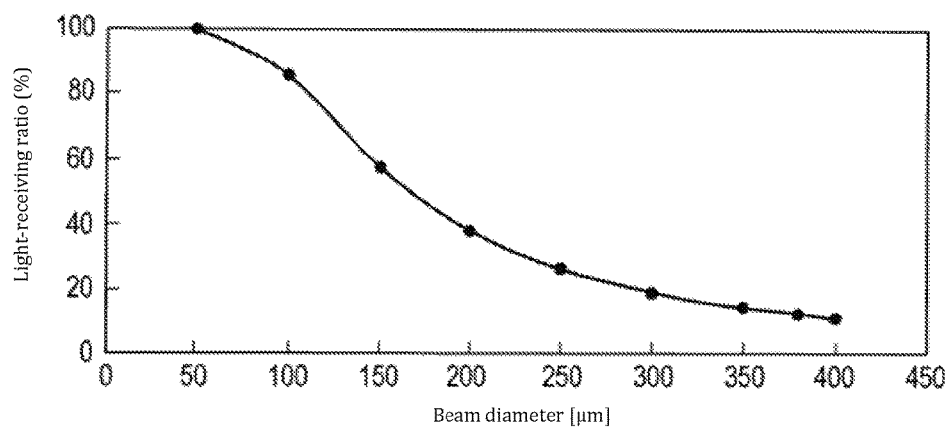
FIG. 3 A graph representing a relationship between a beam diameter and a light-receiving ratio.

The graph illustrated in FIG. 3 illustrates a relationship between the beam diameter and the light-receiving ratio in a situation where a light-receiving diameter of the PD module 20 is 100 µm. According to the present embodiment, the PD module 20 can be made to be of a configuration having a circular light-receiving surface 21A of a diameter of 100 µm.

Figure 6:
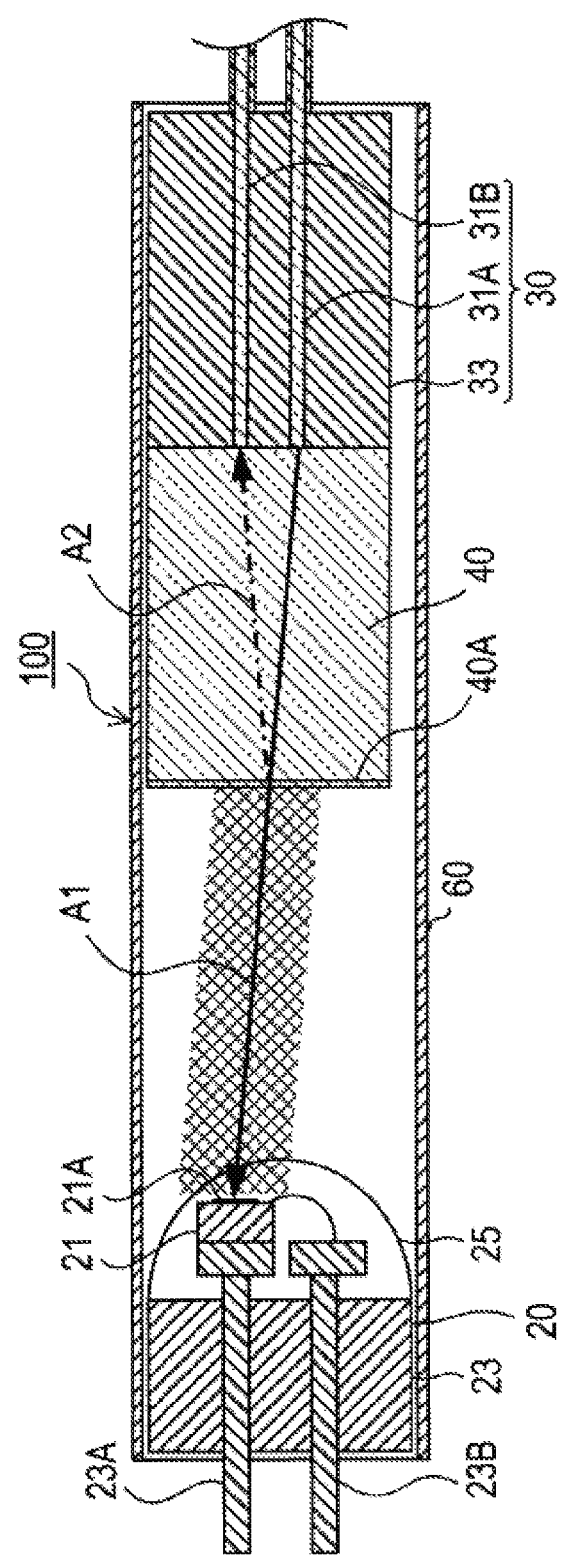
FIG. 6 A diagram representing a schematic configuration of a photodetector of a comparative example.

The beam diameter illustrated in this graph is a beam diameter in a situation where no condensing lens 50 is disposed. A photodetector 100 of a comparative example that is not provided with the condensing lens 50 is illustrated in FIG. 6. The photodetector 100 in FIG. 6 is made to basically be of the same configuration as the photodetector 10 of the present embodiment other than not being provided with the condensing lens 50. In FIG. 6, areas labeled with the same reference signs as those of the photodetector 10 illustrated in FIG. 2 may be understood to be areas identical to those of the photodetector 10.

In the photodetector 100 not provided with the condensing lens 50, as can be understood from the beam diameter schematically illustrated by the crosshatched region in FIG. 6, the beam diameter of the transmitted light that reaches the light-receiving surface 21A tends to become larger than the diameter of the light-receiving surface 21A; due to this, the light-receiving ratio readily decreases.

Such a small light-receiving ratio gives rise to a possibility of a detection precision of the power decreasing or a possibility of a potential detection precision not being realized. Therefore, in the present embodiment, the beam diameter at the light-receiving surface 21A is made to be decreased by the convex condensing lens 50. The condensing lens 50 may be disposed so as to make the beam diameter at the light-receiving surface 21A minimal but does not have to be disposed thus. As long as the light-receiving ratio reaches 100%, there is no need to decrease the beam diameter further. Even if the light-receiving ratio does not reach 100%, if the light-receiving ratio increases by the disposition of the condensing lens 50, the power detection precision of the photodetector 10 improves.

In other words, in the present embodiment, the branching membrane 40A should be configured so when the condensing lens 50 is loaded a transmittance at the branching membrane 40A reaches a target transmittance. That is, in a situation where the condensing lens 50 is loaded on the branching membrane 40A, a refractive index at an interface changes before and after the loading; therefore, a transmittance of the input light also changes. Therefore, in consideration of the transmittance changing between before and after the condensing lens 50 is loaded, the branching membrane 40A needs to be provided so the target transmittance is realized when the condensing lens 50 is loaded.

The condensing lens 50 may be provided by adhering a convex lens to the branching membrane 40A or formed as a condensing lens made of a transparent resin by coating a transparent resin material on the branching membrane 40A opposing the light-receiving surface 21A. The condensing lens 50 may also be a lens of another type.

Described above as the first embodiment is a configuration of the photodetector 10 where the condensing lens 50 is loaded on the GRIN lens 40—particularly, the branching membrane 40A—but the condensing lens 50 may be provided independently from the GRIN lens 40.

Second Embodiment

Figure 4:
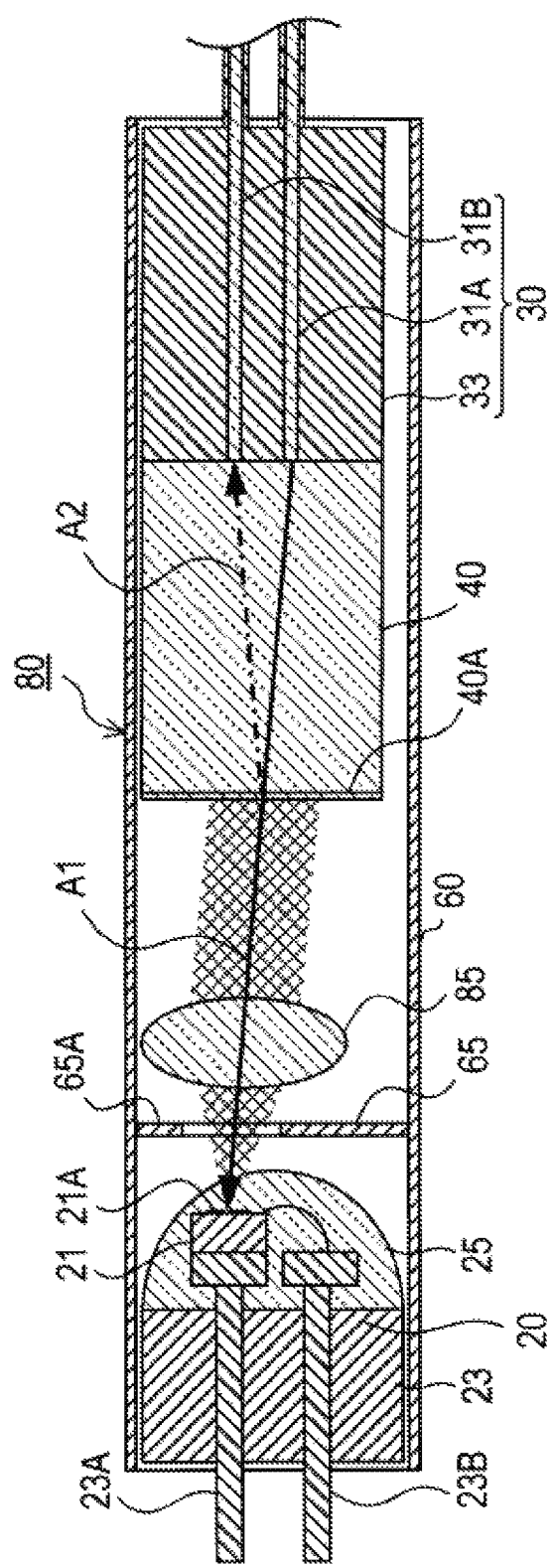
FIG. 4 A diagram schematically representing a cross-sectional structure at a centerline of a photodetector of a second embodiment.

As illustrated in FIG. 4, instead of the condensing lens 50, a photodetector 80 is provided with a condensing lens 85 that is provided independently and separated from the GRIN lens 40 and the PD module 20 in the space between the GRIN lens 40 and the PD module 20.

This photodetector 80 is made to basically be of the same configuration as the photodetector 10 of the first embodiment other than being provided with the condensing lens 85 that is independent from the GRIN lens 40 in the path of the transmitted light from the GRIN lens 40 instead of the condensing lens 50. Areas in FIG. 4 labeled with the same reference signs as those in FIG. 2 may be understood to be configurations basically identical to those of the photodetector 10 of the first embodiment.

As illustrated by the crosshatched region in FIG. 4, the input light from the input fiber 31A that is collimated by the GRIN lens 40 and output via the branching membrane 40A from the GRIN lens 40 is condensed by the condensing lens 85 provided away from the GRIN lens 40 and guided to the light-receiving surface 21A. The condensing lens 85 may be a convex lens, a ball lens, or another type of condensing lens.

In the present embodiment as well, the beam diameter at the light-receiving surface 21A is decreased, improving the light-receiving ratio. Therefore, the power-detection precision of the photodetector 80 improves.

Third Embodiment

Figure 5:
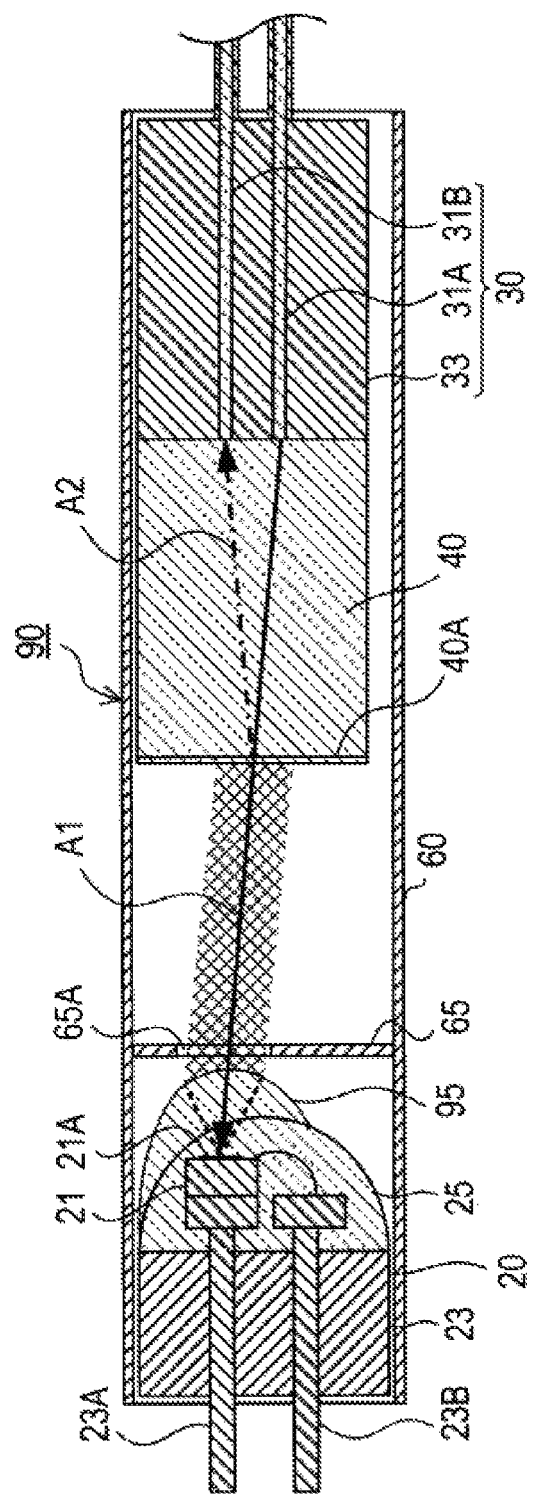
FIG. 5 A diagram schematically representing a cross-sectional structure at a centerline of a photodetector of a third embodiment.

As illustrated in FIG. 5, instead of the condensing lens 50, a photodetector 90 of a third embodiment is provided with a condensing lens 95 loaded to a surface of the transparent resin layer 25.

This photodetector 90 is made to be basically of the same configuration as the photodetector 10 of the first embodiment other than the convex condensing lens 95 that replaces the condensing lens 50 being joined to the transparent resin layer 25 of the PD module 20. Areas in FIG. 5 labeled with the same reference signs as those in FIG. 2 may be understood to be configurations basically identical to those of the photodetector 10 of the first embodiment.

As illustrated by the crosshatched region and the dashed line in FIG. 5, the input light from the input fiber 31A that is collimated by the GRIN lens 40 and output via the branching membrane 40A from the GRIN lens 40 is condensed by the condensing lens 95 on the transparent resin layer 25, which is provided in the path before the light-receiving surface 21A is reached, and guided to the light-receiving surface 21A.

In the present embodiment as well, because the beam diameter at the light-receiving surface 21A is decreased, improving the light-receiving ratio, the power-detection precision of the photodetector 90 improves. In other words, the condensing lens 95 can be formed by coating the potting material on the stem 23 and the PD chip 21 to form the transparent resin layer 25 and then coating and curing more of the same potting material on the transparent resin layer 25. In this situation, the condensing lens 95 is configured as a condensing lens made of a resin that is a member identical to the transparent resin layer 25. However, the condensing lens 95 may also be formed using a potting material different from the potting material used to form the transparent resin layer 25 (for example, a potting material with a different refractive index).

In the photodetector 90, a ball lens may be provided in a vicinity of the transparent resin layer 25 instead of the condensing lens 95. The ball lens has a short focal length and is suited to condensing at a position near the light-receiving surface 21A.

OTHER

Illustrative embodiments of the present invention are described above, but the present invention is not limited to the embodiments above and may adopt various aspects. For example, the photodetectors 10, 80, 90 are not limited to use in an optical communication device. The GRIN lens 40 may be replaced with another collimating lens. For example, the GRIN lens 40 may be replaced with an aspherical lens.

The PD module 20 may be a PD module of another type—for example, a TO (CAN) type. A plurality of independent condensing lenses 85 may be provided in the propagation path of the transmitted light from the GRIN lens 40. The photodetectors 10, 80, 90 may be provided with two or more of the condensing lens 50 on the GRIN lens 40, the condensing lens 95 on the PD module 20, and the condensing lens 85 that is independent from the GRIN lens 40 and the PD module 20. The various configurations of the present disclosure may include a photodetector where the diameter of the light-receiving surface 21A is no more than 100 m.

A function had by one component in the embodiments above may be provided dispersed between a plurality of components. A function had by a plurality of components may be integrated into one component. A portion of the configuration of the embodiments above may be omitted. At least a portion of the configuration of an embodiment above may be added to or replace the configuration of another embodiment above. All aspects included within the technical idea specified from the wording given in the scope of patent claims are embodiments of the present disclosure.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . optical communication device; 10 . . . photodetector; 20 . . . PD module; 21 . . . PD chip; 21A . . . light-receiving surface; 23 . . . stem; 23A, 23B . . . electrode pin; 25 . . .

transparent resin layer; 30 . . . optical fiber pigtail; 31A, 31B . . . optical fiber; 33 . . . capillary; 40 . . . GRIN lens; 40A . . . branching membrane; 50 . . . condensing lens; 60 . . . tubular case; 80 . . . photodetector; 85 . . . condensing lens; 90 . . . photodetector; 95 . . . condensing lens; L, L1, L2 . . . optical transmission line.

What is claimed is:

1. A detection device that detects a power of an input light, comprising:
    a light-receiving module comprising a first light-receiving surface and that outputs an electrical signal according to the power of the input light received at the first light-receiving surface;
    an optical lens comprising second and third light-receiving surfaces lying perpendicular to an axial direction of an optical fiber that transmits the input light, the second and third light receiving surfaces lying on opposites faces of the optical lens, and that collimates and guides to the first light-receiving surface the input light from the optical fiber; and
    a condenser that:
        is provided in a path of the input light between the optical lens and the first light-receiving surface,
        decreases a beam diameter of the input light at the first light-receiving surface, and
        is formed on a surface of the optical lens opposing the second light-receiving surface.

2. The detection device according to claim 1, wherein the condenser is a condensing lens made of a resin coated on the surface of the optical lens opposing the second light-receiving surface.

3. A detection device that detects a power of an input light, comprising:
    a light-receiving module comprising a first light-receiving surface on a photodiode and that outputs an electrical signal according to the power of the input light received at the first light-receiving surface;
    an optical lens, comprising second and third light-receiving surfaces lying perpendicular to an axial direction of an optical fiber that transmits the input light, the second and third light receiving surfaces lying on opposites faces of the optical lens, that collimates and guides to the first light-receiving surface the input light from the optical fiber; and
    a condenser that is provided in a path of the input light between the optical lens and the first light-receiving surface and that decreases a beam diameter of the input light at the first light-receiving surface, wherein
    the light-receiving module comprises a transparent covering body that encloses the photodiode, and
    the condenser is formed on a surface of the covering body.

4. The detection device according to claim 3, wherein the condenser is a condensing lens made of a resin coated on the surface of the covering body.

5. The detection device according to claim 4, wherein the condensing lens made of the resin on the surface of the covering body comprises a potting material identical to that of the covering body.

6. The detection device according to claim 1, wherein a diameter of the first light-receiving surface is no more than 100 μm.

7. The detection device according to claim 1, wherein the input light is an optical communication signal;
    the detection device further comprises an optical fiber pigtail including two optical fibers connected to an optical transmission line through which the optical communication signal is transmitted;
    the optical lens collimates the input light from one end of one of the two optical fibers, separates the input light into a transmitted light and a reflected light, guides the transmitted light to the first light-receiving surface, and guides the reflected light as output to the other of the two optical fibers; and
    the light-receiving module outputs the electrical signal according to the power of the input light that is the input light from the optical transmission line via the input fiber and received at the first light-receiving surface.

8. The detection device according to claim 1, wherein the optical lens collimates the input light from the outside and separates this input light into a transmitted light and a reflected light by a branching membrane provided on the surface of the optical lens opposing the second light-receiving surface, and guides the transmitted light to the first light-receiving surface, and
    the condenser is formed adjacent to the branching membrane.

\* \* \* \* \*